US010708772B2

(12) United States Patent
Wager et al.

(10) Patent No.: US 10,708,772 B2
(45) Date of Patent: Jul. 7, 2020

(54) METHOD AND APPARATUS FOR SECURITY KEY GENERATION FOR DUAL CONNECTIVITY

(71) Applicant: Telefonaktiebolaget LM Ericsson (publ), Stockholm (SE)

(72) Inventors: Stefan Wager, Espoo (FI); Niklas Johansson, Sollentuna (SE); Karl Norrman, Stockholm (SE); Oumer Teyeb, Solna (SE); Vesa Virkki, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/111,979

(22) Filed: Aug. 24, 2018

(65) Prior Publication Data

US 2018/0367991 A1 Dec. 20, 2018

Related U.S. Application Data

(63) Continuation of application No. 15/052,514, filed on Feb. 24, 2016, which is a continuation of application
(Continued)

(51) Int. Cl.
*H04W 88/04* (2009.01)
*H04W 12/04* (2009.01)
(Continued)

(52) U.S. Cl.
CPC .............. *H04W 12/04* (2013.01); *H04L 9/14* (2013.01); *H04L 63/061* (2013.01);
(Continued)

(58) Field of Classification Search
None
See application file for complete search history.

(56) References Cited

U.S. PATENT DOCUMENTS 6,453,159 B1 9/2002 Lewis
8,284,734 B2 * 10/2012 Meylan ............ H04W 36/0055
370/331
(Continued)

FOREIGN PATENT DOCUMENTS

CN 1618241 A 5/2005
CN 101159748 A 4/2008
(Continued)

OTHER PUBLICATIONS

TW200807999. LG Electronics. (Year: 2008).*
(Continued)

*Primary Examiner* — Venkat Perungavoor
(74) *Attorney, Agent, or Firm* — Murphy, Bilak & Homiller, PLLC

(57) ABSTRACT

Techniques for the secure generation of a set of encryption keys to be used for communication between a wireless terminal and an assisting base station in a dual-connectivity scenario. An example method includes generating an assisting security key for the assisting base station, based on an anchor base station key. The generated assisting security key is sent to the assisting base station, for use by the assisting base station in encrypting data traffic sent to the wireless terminal or in generating one or more additional assisting security keys for encrypting data traffic sent to the wireless terminal while the wireless terminal is dually connected to the anchor base station and the assisting base station. The anchor base station key, or a key derived from the anchor base station key, is used for encrypting data sent to the wireless terminal by the anchor base station.

9 Claims, 8 Drawing Sheets

Related U.S. Application Data

No. 14/372,920, filed as application No. PCT/SE2014/050122 on Jan. 30, 2014, now Pat. No. 9,301,134.

(60) Provisional application No. 61/758,373, filed on Jan. 30, 2013.

(51) Int. Cl.
*H04L 29/06* (2006.01)
*H04L 9/14* (2006.01)
*H04W 88/10* (2009.01)
*H04W 36/00* (2009.01)

(52) U.S. Cl.
CPC ...... *H04L 2209/24* (2013.01); *H04L 2209/80* (2013.01); *H04W 36/0069* (2018.08)

(56) References Cited

U.S. PATENT DOCUMENTS

| | | | |
|---|---|---|---|
| 8,676,164 | B2 | 3/2014 | Iwamura et al. |
| 9,144,003 | B2 | 9/2015 | Radulescu et al. |
| 9,301,134 | B2 | 3/2016 | Wager et al. |
| 9,807,623 | B2 | 10/2017 | Wang et al. |
| 9,913,136 | B2* | 3/2018 | Lee ................... H04W 12/04 |
| 9,913,177 | B2 | 3/2018 | Sharma |
| 2005/0190740 | A1 | 9/2005 | Zhao et al. |
| 2005/0213538 | A1 | 9/2005 | Ebiko et al. |
| 2006/0233376 | A1 | 10/2006 | Forsberg et al. |
| 2008/0039096 | A1* | 2/2008 | Forsberg ............ H04L 63/126 455/438 |
| 2008/0130580 | A1* | 6/2008 | Chaponniere ......... H04W 36/02 370/331 |
| 2010/0082973 | A1 | 4/2010 | Brickell et al. |
| 2010/0190533 | A1 | 7/2010 | Black et al. |
| 2010/0191971 | A1 | 7/2010 | Bajic et al. |
| 2010/0227611 | A1 | 9/2010 | Schmidt et al. |
| 2011/0110329 | A1 | 5/2011 | Yang et al. |
| 2011/0268277 | A1* | 11/2011 | Kurokawa ............ H04L 9/3242 380/270 |
| 2012/0039468 | A1 | 2/2012 | Ishida et al. |
| 2012/0057704 | A1 | 3/2012 | Chen |
| 2012/0149419 | A1 | 6/2012 | Roh |
| 2012/0163336 | A1* | 6/2012 | Adjakple ............ H04W 12/04 370/331 |
| 2013/0053048 | A1 | 2/2013 | Garcia et al. |
| 2013/0128766 | A1 | 5/2013 | Tachikawa et al. |
| 2014/0004861 | A1 | 1/2014 | Choi |
| 2014/0295823 | A1 | 10/2014 | Someya et al. |
| 2015/0009923 | A1 | 1/2015 | Lei et al. |
| 2016/0029213 | A1 | 1/2016 | Rajadurai et al. |
| 2017/0171748 | A1 | 6/2017 | Deng et al. |

FOREIGN PATENT DOCUMENTS

| | | |
|---|---|---|
| CN | 101228766 A | 7/2008 |
| CN | 101233734 A | 7/2008 |
| CN | 101742496 A | 6/2010 |
| CN | 102548049 A | 7/2012 |
| CN | 102655641 A | 9/2012 |
| CN | 102695227 A | 9/2012 |
| CN | 102740289 A | 10/2012 |
| CN | 103188663 A | 7/2013 |
| CN | 107257353 A | 10/2017 |
| CN | 107809443 A | 3/2018 |
| EP | 1422875 A2 | 5/2004 |
| EP | 2320592 A1 | 5/2011 |
| JP | H11508742 A | 7/1999 |
| JP | 2011507369 A | 3/2011 |
| JP | 2011101358 A | 5/2011 |
| JP | 2013004434 A | 1/2013 |
| KR | 20080100746 A | 11/2008 |
| KR | 20110017426 A | 2/2011 |
| RU | 2459380 C2 | 8/2012 |
| WO | 2010119656 A1 | 10/2010 |
| WO | 2011005676 A2 | 1/2011 |
| WO | 2011088901 A1 | 7/2011 |
| WO | 2013116976 A1 | 8/2013 |
| WO | 2014109602 A1 | 7/2014 |
| WO | 2014112001 A1 | 7/2014 |
| WO | 2014113686 A2 | 7/2014 |
| WO | 2014120077 A1 | 8/2014 |

OTHER PUBLICATIONS

WO 2013147788 A1. Intel Corporation. (Year: 2013).*
CN10269227B. Hong et al. (Year: 2012).*
3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.3.0, Dec. 2012, pp. 1-141.
Blankenship, Yufei W., "Achieving High Capacity with Small Cells in LTE-A", Fiftieth Annual Allerton Conference Allerton House, UIUC, Illinois, USA 2012 IEEE, Oct. 1-5, 2012, pp. 1680-1687.
Krichene, Neila et al., "Securing Roaming and Vertical Handover in Fourth Generation Networks", IEEE, 2009 Third International Conference on Network and System Security, University of Carthage, Tunisia, 2009, pp. 1-7.
Unknown, Author, "3GPP TS 23.401 V11.4.0", 3rd Generation Partnership Project; Technical Specification Group Services and System Aspects; General Packet Radio Service (GPRS) enhancements for Evolved Universal Terrestrial Radio Access Network (E-UTRAN) access (Release 11), Dec. 2012, pp. 1-284.
Unknown, Author, "3GPP TS 36.300 V11.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Dec. 2012, pp. 1-208.
Unknown, Author, "3GPP TS 36.331 V11.2.0", 3rd Generation Partnership Project; Technical Specification Group Radio Access Network; Evolved Universal Terrestrial Radio Access (E-UTRA); Radio Resource Control (RRC); Protocol specification (Release 11), Dec. 2012, pp. 1-340.
Unknown, Author, "Comparison of Key Refresh Solutions", 3GPP TSG SA WG3 Security—S3#47, S3-070368, Nokia, Nokia Siemens Networks, Tallinn, Estonia, May 22-25, 2007, 5 pages.
Unknown, Author, "Correction of AS Key Handling—Pseudo CR to TR 33.821", 3GPP TSG SA WG3 Security, S3-090103, Nokia Corporation, Nokia Siemens Networks, Florence, Italy, SA3#54, Jan. 19-23, 15 Pages.
Unknown, Author, "CR-33401: KeNB Forward Security Solution", 3GPP TSG SA WG3 Security—S3#51, S3-080846, NTT Docomo, Qualcomm, NEC Corporation, Sophia-Antipolis, France, Jun. 23-27, 2008, 15 Pages.
Unknown, Author, "Discussion on U-plane Architecture for Dual Connectivity", 3GPP TSG-RANA WG2 #81, Tdoc R2-130324, NTT Docomo, Inc., St. Julian's, Malta, Jan. 28-Feb. 1, 2013, 7 pages.
Unknown, Author, "Key derivation functions of EPS.", 3GPP TSG SA WG3 Security—S3#51 S3-080378 Vancouver, Canada, Apr. 14-18, 2008, pp. 1-2.
Unknown, Author, "Security in Dual Connectivity", 3GPP TSG-RAN WG2 #82, Tdoc R2-131671, Ericsson/ST-Ericsson, Fukuoka, Japan, May 20-24, 2013, pp. 1-3.
Cao, Jin, et al., "A simple and robust handover authentication between HeNB and eNB in LTE networks", Computer Networks 56, 2012, pp. 2119-2131.
Yusof, Azita Laily, et al., "Handover Adaptations for Load Balancing Scheme in Macrocell/Femtocell LTE Network", Journal of Advances in Computer Networks, vol. 1, No. 4, Dec. 2013, pp. 339-342.

* cited by examiner

METHOD AND APPARATUS FOR SECURITY KEY GENERATION FOR DUAL CONNECTIVITY

RELATED APPLICATIONS

This application is a continuation of U.S. application Ser. No. 15/052,514 filed 24 Feb. 2016, which is a continuation of U.S. application Ser. No. 14/372,920 filed 17 Jul. 2014, which issued as U.S. Pat. No. 9,301,134 and is a U.S. National Phase Application of PCT/SE2014/050122 filed 30 Jan. 2014, which claims benefit of U.S. Provisional Application No. 61/758,373 filed 30 Jan. 2013. The entire contents of each of the aforementioned applications is incorporated herein by reference.

TECHNICAL FIELD

The technology disclosed herein rebates generally to wireless telecommunications networks, and more particularly relates to techniques for handling security keys in dual connectivity scenarios, i.e., scenarios in which a mobile terminal is connected to multiple base stations simultaneously.

BACKGROUND

In a typical cellular radio system, mobile terminals (also referred to as user equipment, UEs, wireless terminals, and/or mobile stations) communicate via a radio access network (RAN) with one or more core networks, which provide access to data networks, such as the Internet, and/or to the public-switched telecommunications network (PSTN). A RAN covers a geographical area that is divided into cell areas, with each cell area being served by a radio base station (also referred to as a base station, a RAN node, a "NodeB", and/or an enhanced NodeB or "eNodeB"). A cell area is a geographical area over which radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code-Division Multiple Access), HSPA (High-Speed Packet Access), and Long Term Evolution (LTE) wireless technologies. Fueled by the introduction of new devices designed for data applications, end user performance requirements continue to increase. The increased adoption of mobile broadband has resulted in significant growth in traffic handled by high-speed wireless data networks. Accordingly, techniques that allow cellular operators to manage networks more efficiently are desired.

Techniques to improve downlink performance may include Multiple-Input-Multiple-Output (MIMO) multi-antenna transmission techniques, multi-flow communication, multi-carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. One approach is through the deployment of so-called heterogeneous networks.

A homogeneous network is a network of base stations (also referred to as NodeB's, enhanced NodeB's, or eNBs) in a planned layout, providing communications services for a collection of user terminals (also referred to as user equipment nodes, UEs, and/or wireless terminals), in which all base stations typically have similar transmit power levels, antenna patterns, receiver noise floors, and/or backhaul connectivity to the data network. Moreover, all base stations in a homogeneous network may generally offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), WiMAX (Worldwide Interoperability for Microwave Access), etc.

In a heterogeneous network, low power base stations (also referred to as low power nodes (LPNs), micro nodes, pico nodes, femto nodes, relay nodes, remote radio unit nodes, RRU nodes, small cells, RRUs, etc.) may be deployed along with or as an overlay to planned and/or regularly placed macro base stations. A macro base station (MBS) may thus provide service over a relatively large macro cell area, and each LPN may provide service for a respective relatively small LPN cell area within the relatively large macro cell area.

Power transmitted by an LPN may be relatively small, e.g., 2 Watts, compared to power transmitted by a macro base station, which may be 40 Watts for a typical macro base station. An LPN may be deployed, for example, to reduce/eliminate a coverage hole(s) in the coverage provided by the macro base stations, and/or to off-load traffic from macro base stations, such as to increase capacity in a high traffic location or so-called hot-spot. Due to its lower transmit power and smaller physical size, an LPN may offer greater flexibility for site acquisition.

Thus, a heterogeneous network features a multi-layered deployment of high-power nodes (HPNs), such as macro base stations, and low-power nodes (LPNs), such as so-called pico-base stations or pico-nodes. The LPNs and HPNs in a given region of a heterogeneous network may operate on the same frequency, in which case the deployment may be referred to as a co-channel heterogeneous deployment, or on different frequencies, in which case the deployment may be referred to as an inter-frequency or multi-carrier or multi-frequency heterogeneous deployment.

The Third Generation Partnership Project (3GPP) is continuing to develop specifications for advanced and improved features in the context of the fourth-generation wireless telecommunications system known as LTE (Long Term Evolution). In Release 12 of the LTE specifications and beyond, further enhancements related to low-power nodes and heterogeneous deployments will be considered under the umbrella of "small-cell enhancements" activities. Some of these activities will focus on achieving an even higher degree of interworking between the macro and low-power layers, including through the use of a set of techniques and technology referred to as "dual-layer connectivity" or simply "dual connectivity."

As shown in FIG. 1, dual connectivity implies that the device has simultaneous connections to both macro and low-power layers. FIG. 1 illustrates an example of a heterogeneous network in which a mobile terminal 101 uses multiple flows, e.g., an anchor flow from the macro base station (or "anchor eNB") 401A and an assisting flow from a pico base station (or an "assisting eNB") 401B. Note that terminology may vary—the anchor base station and assisting base station in a configuration like that shown in FIG. 1 may sometimes be referred to as "master" and "slave" base stations or according to other names. It should be further noted that while the terms "anchor/assisting" and "master/slave" suggest a hierarchical relationship between the base stations involved in a dual connectivity scenario, many of the principles and techniques associated with dual connectivity may be applied to deployment scenarios where there is no such hierarchical relationship, e.g., between peer base stations. Accordingly, while the terms "anchor base station" and "assisting base station" are used herein, it should be understood that the techniques and apparatus described herein are not limited to embodiments that use that terminology, nor are they necessarily limited to embodiments having the hierarchical relationship suggested by FIG. 1.

Dual connectivity may imply, in various embodiments and/or scenarios:

Control and data separation where, for instance, the control signaling for mobility is provided via the macro layer at the same time as high-speed data connectivity is provided via the low-power layer.

A separation between downlink and uplink, where downlink and uplink connectivity is provided via different layers.

Diversity for control signaling, where Radio Resource Control (RRC) signaling may be provided via multiple links, further enhancing mobility performance.

Macro assistance including dual connectivity may provide several benefits:

Enhanced support for mobility—by maintaining the mobility anchor point in the macro layer, as described above, it is possible to maintain seamless mobility between macro and low-power layers, as well as between low-power nodes.

Low overhead transmissions from the low-power layer—by transmitting only information required for individual user experience, it is possible to avoid overhead coming from supporting idle-mode mobility within the local-area layer, for example.

Energy-efficient load balancing—by turning off the low-power nodes when there is no ongoing data transmission, it is possible to reduce the energy consumption of the low-power layer.

Per-link optimization—by selecting the termination point for uplink and downlink separately, the node selection can be optimized for each link.

One of the problems in using dual connectivity is how to map the data radio bearers (DRBs) onto the anchor flow and assisting flow, respectively. One option for splitting the DRBs between two base stations, as shown in FIG. 1, is to keep the control plane (RRC) in the anchor eNB and distribute the PDCP entities so that some of them are in the anchor eNB and some of them in the assisting eNB. As discussed in further detail below, this approach may yield some important system efficiency benefits. However, this approach creates problems related to the handling of security keys that are used for confidentiality and integrity protection of the data transmitted to and from the mobile terminal.

SUMMARY

In LTE systems, the Radio Resource Control (RRC) layer configures Packet Data Convergence Protocol (PDCP) entities with cryptographic keys and configuration data, such as data indicating which security algorithms should be applied in connection with the corresponding radio bearer. In a dual-connectivity scenario, the RRC layer may be handled exclusively by the anchor node, while PDCP entities may be managed in each of the anchor and assisting base station nodes. Since the anchor base station and the assisting base station may be implemented in physically separate nodes, the assumption that RRC can configure the PDCP entities via internal application program interfaces (APIs) no longer holds.

The example embodiments disclosed herein are directed towards the secure generation of a set of encryption keys to be used for communication between a wireless terminal in dual connectivity and an assisting eNB. In some embodiments, a base key for the assisting eNB is generated from the security key of the anchor eNB. The base key can then be used to generate keys for secure communication between the wireless terminal and the assisting eNB.

Embodiments of the disclosed techniques include, for example, a method, suitable for implementation in a network node, for security key generation for secured communications between a wireless terminal and an anchor base station and between the wireless terminal and an assisting base station, where the wireless terminal is or is about to be dually connected to the anchor base station and the assisting base station. The example method includes generating an assisting security key for the assisting base station, based, at least in part, on an anchor base station key. The generated assisting security key is then sent to the assisting base station, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station. The anchor base station key, or a key derived from the anchor base station key, is used for encrypting data sent to the wireless terminal by the anchor base station while the wireless terminal is dually connected to the anchor base station and the assisting base station.

Also disclosed herein is another method for generating an assisting security key for an assisting base station. Like the method summarized above, this method is also suitable for implementation in a network node, for security key generation for secured communications between a wireless terminal and an anchor base station and between the wireless terminal and an assisting base station, where the wireless terminal is or is about to be dually connected to the anchor base station and the assisting base station. In this method, however, the method may be carried out in a network node other than the anchor base station, using a primary key that may be unknown to the anchor base station.

According to this second example method, a primary security key is shared between the network node and the wireless terminal. This key may be unknown to the anchor base station, in some embodiments. The method continues with generating an assisting security key for the assisting base station, based, at least in part, on the primary security key. The generated assisting security key is then sent to the assisting base station, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station. In some embodiments, the generated assisting security key is sent directly to the assisting base station such that the anchor base station is not aware of the key, while in other embodiments the generated assisting security key is sent to the assisting base station indirectly, via the anchor base station.

Other embodiments of the technology disclosed herein include network node apparatus and mobile terminal appa-

DETAILED DESCRIPTION

Figure 1:
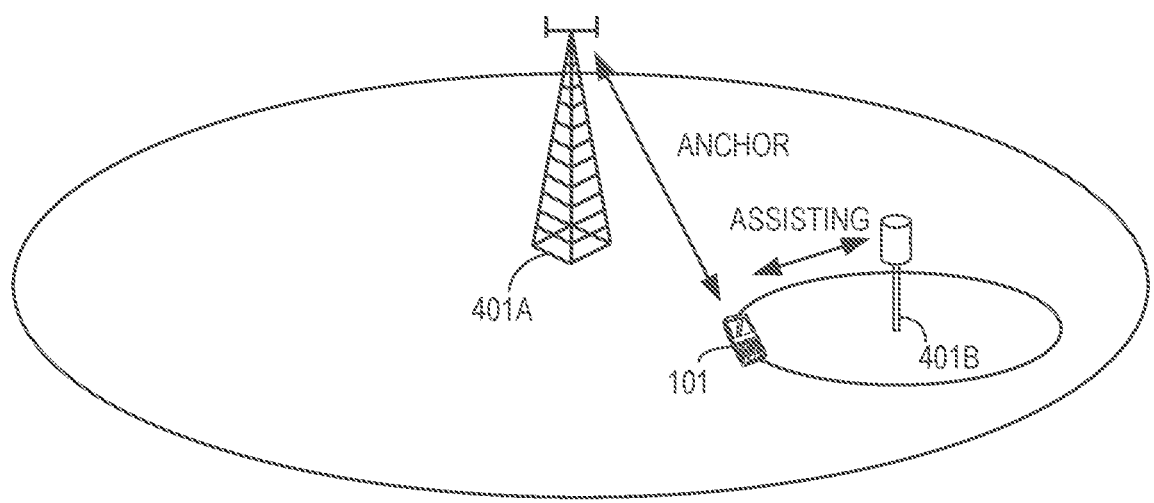
FIG. 1 is a schematic diagram illustrating an example of a heterogeneous dual connectivity deployment with simultaneous anchor and assisting flows to a mobile terminal.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, these and other embodiments of present inventive concepts are described herein in the context of operating in a Radio Access Network (RAN) that communicates over radio communication channels with mobile terminals (also referred to as wireless terminals or UEs). As used herein, a mobile terminal, wireless terminal, or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers that make up the UMTS radio access network. Thus, UTRAN is essentially a radio access network using wideband code division multiple access (WCDMA) for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from LTE is generally used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal or mobile terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

While embodiments discussed herein may focus on example embodiments in which described solutions are applied in heterogeneous networks that include a mix of relatively higher-power base stations (e.g., "macro" base stations, which may also be referred to as wide-area base stations or wide-area network nodes) and relatively lower-power nodes (e.g., "pico" base stations, which may also be referred to as local-area base stations or local-area network nodes), the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

Figure 2:
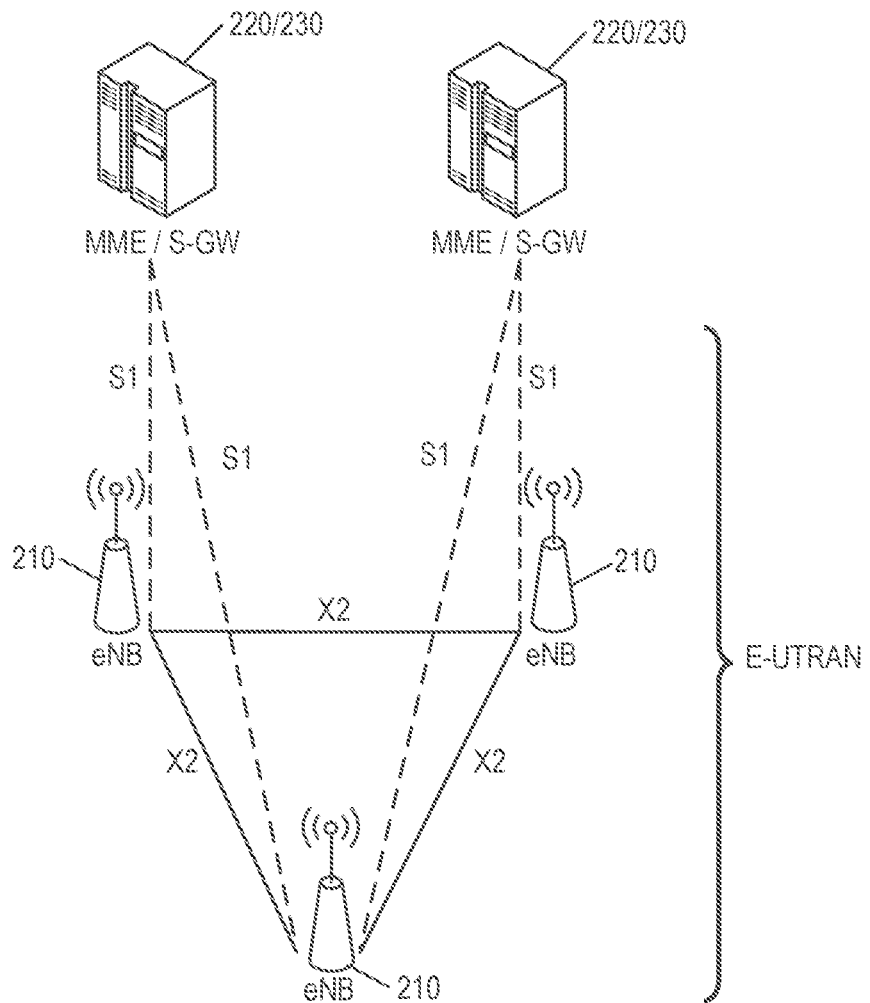
FIG. 2 illustrates components of the E-UTRAN system architecture.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 2.

The eNB 210 hosts functionalities such as Radio Resource Management (RRM), radio bearer control, admission control, header compression of user plane data towards serving gateway, and/or routing of user plane data towards the serving gateway. The MME 220 is the control node that processes the signaling between the UE and the CN (core network). Significant functions of the MME 220 are related to connection management and bearer management, which are handled via Non Access Stratum (NAS) protocols. The S-GW 230 is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW, not shown in FIG. 2) is the node responsible for UE IP address allocation, as well as Quality of Service (QoS) enforcement (as further discussed below). The reader is referred to 3GPP TS 36.300 and the references therein for further details of functionalities of the different nodes.

In describing various embodiments of the presently disclosed techniques, the non-limiting term radio network node may be used to refer any type of network node serving UE and/or connected to other network node or network element or any radio node from where UE receives signal. Examples of radio network nodes are Node B's, base stations (BS), multi-standard radio (MSR) radio nodes such as MSR BS's, eNodeB's, network controllers, radio network controllers (RNCs), base station controllers, relays, donor nodes controlling relays, base transceiver stations (BTS), access points (AP), wireless routers, transmission points, transmission nodes, remote radio units (RRUs), remote radio heads (RRHs), nodes in a distributed antenna system (DAS), etc.

In some cases a more general term "network node" is used; this term may correspond to any type of radio network node or any network node that communicates with at least a radio network node. Examples of network nodes are any radio network node stated above, core network nodes (e.g., MSC, MME, etc.), O&M, OSS, SON, positioning nodes (e.g., E-SMLC), MDT, etc.

In describing some embodiments, the term user equipment (UE) is used, and refers to any type of wireless device communicating with a radio network node in a cellular or mobile communication system. Examples of UEs are target devices, device-to-device UEs, machine-type UEs or UEs capable of machine-to-machine communication, PDAs, wireless-enabled table computers, mobile terminals, smart phones, laptop embedded equipped (LEE), laptop mounted equipment (LME), USB dongles, customer premises equipment (CPE), etc. The term "mobile terminal" as used herein should be understood as being generally interchangeable with the term UE as used herein and in the various specifications promulgated by the 3GFP, but should not be understood as being limited to devices compliant to 3GPP standards.

The example embodiments presented herein are specifically directed towards key generation when the LTE Un-protocol stack is split between a macro cell and an assisting eNB cell. The techniques and apparatus are more generally applicable to key generation in other dual-connectivity scenarios.

Figure 3:
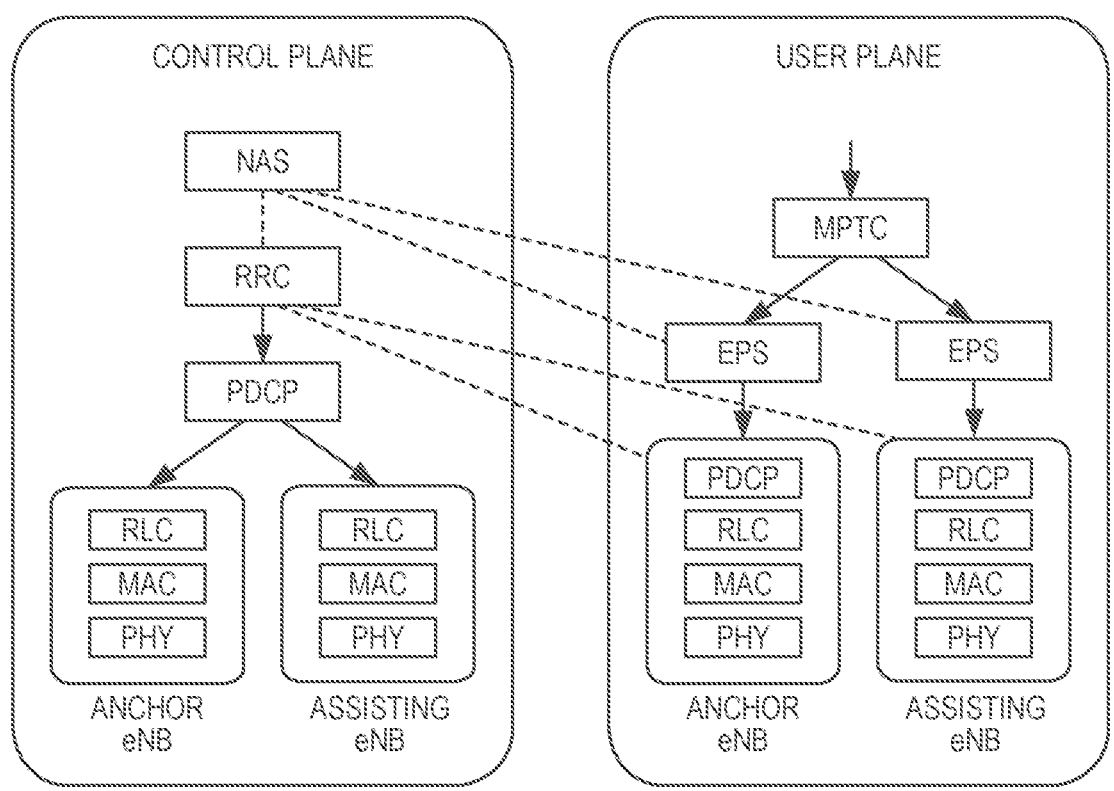
FIG. 3 illustrates details of the base station protocol architecture in a dual-connectivity scenario.

As noted above, one option for splitting data radio bearers (DRBs) between two base stations in a dual-connectivity scenario is to keep the control plane, which is managed by the Radio Resource Control (RRC) protocol, in the anchor eNB, while distributing the Packet Data Convergence Protocol (PDCP) entities, which are associated with individual radio bearers, so that one or more are terminated in the anchor eNB and one or more in the assisting eNB The RRC layer configures all PDCP entities with which it is associated. This is illustrated in FIG. 3, which shows an example of a protocol architecture for multiple connectivity.

More particularly, RRC configures the PDCP entities with cryptographic keys and configuration data, such as data indicating which security algorithms should be applied in connection with the corresponding radio bearer. For connections associated with a given mobile terminal, RRC configures all PDCP entities for user plane traffic (DRB) with one and the same encryption key, KUP-enc, and all PDCP entiles for control plane traffic (SRB) with one and the same encryption key. KRRC-enc, and one and the same integrity protection key, KRRC-int. For DRBs used to protect data between a donor-eNB and a relay node, RRC also configures the DRBs with an integrity protection key, KUP-int.

Since the anchor eNB and the assisting eNB may be implemented in separate physical nodes, the assumption that RRC can configure the PDCP entities via internal application program interfaces (APIs) no longer holds. That is to say, the current situation where the security configuration data can be assumed to be safely kept inside the physically secure environment of the eNB no longer stands. Instead, the RRC entity in the anchor eNB has to configure the PDCP entities in the assisting eNB, which is outside of the secure environment of the anchor eNB.

Anchor eNB and assisting eNB are used here to define different roles of eNBs from a UE or wireless terminal perspective. It is acknowledged that this is just an example naming and they could as well be called something else, like anchor and booster, master and slave, or simply eNB_1 and eNB_2.

The security design of LTE generally provides compartmentalization of security functions. This compartmentalization is intended to ensure that if an attacker breaks the security of one function, only that function is compromised. For example, there is one key used for encryption of the RRC protocol and another key used for integrity protection of the RRC protocol. If an attacker breaks the encryption key, he can decrypt and read all RRC messages. However, since the integrity key is different from the encryption key, the attacker cannot modify or inject RRC messages.

Another aspect of the compartmentalization approach used in LTE is that each eNB uses a separate set of keys. The rationale for this is that this approach ensures that an attacker breaking in to one eNB does not gain any information about data transmitted between a wireless terminal and another physically different eNB. In a dual-connectivity scenario, then, to maintain the property that breaking into one physical RAN node, i.e., an eNB, does not help in attacking another RAN node, the assisting eNB should use its own key set, separate from the key set used in the anchor eNB.

A dual-connectivity architecture may open three new paths for potential security attacks, depending on the techniques adopted for handling security keys and parameters. First, the transport of the security configuration and cryptographic keys from the anchor eNB to the assisting eNB provides a point at which an attacker may eavesdrop on or may modify the keys and configuration data. Secondly, an attacker may physically break into an assisting eNB, and eavesdrop on or modify the keys and configuration data there. In addition, an attacker that physically breaks into an assisting eNB may read, modify or inject user plane data for any wireless terminal connected to the assisting eNB. Thirdly, the attacker may access and modify the user plane data when the assisting eNB sends and receives it. This is true regardless of whether the user plane data flows between the assisting eNB and the anchor eNB, between the assisting eNB and the S-GW, or if data is broken out to the internet locally in the assisting eNB.

The example embodiments disclosed herein are directed towards the secure generation of a set of encryption keys to be used for communication between a wireless terminal in dual connectivity and an assisting eNB. In some embodiments, a base key for the assisting eNB is generated from the security key of the anchor eNB. The base key can then be used to generate keys for secure communication between the wireless terminal and the assisting eNB.

Key Establishment for Assisting eNB

In LTE, the key set in an eNB comprises the $K_{eNB}$, and $K_{UP-enc}$, $K_{RRC-enc}$ and $K_{RRC-int}$. Depending on what functions the assisting eNB provides, the key set needed by the assisting eNB will differ. Since the assisting eNB will at least terminate user plane encryption, it is useful to establish an encryption key that the assisting eNB shares with the wireless terminal. If the assisting eNB will provide services for relay-nodes, there is also a need for an integrity key to protect the DRBs that carry the relay-node control plane traffic. It is hence useful to establish a base key for the assisting eNB, similar to the $K_{eNB}$, from which other keys can be derived. Henceforth the discussion will be about establishing a base key, called $K_{assisting\_eNB}$, but the same reasoning can obviously be applied to the case where, for example, only an encryption key is established.

Figure 4:
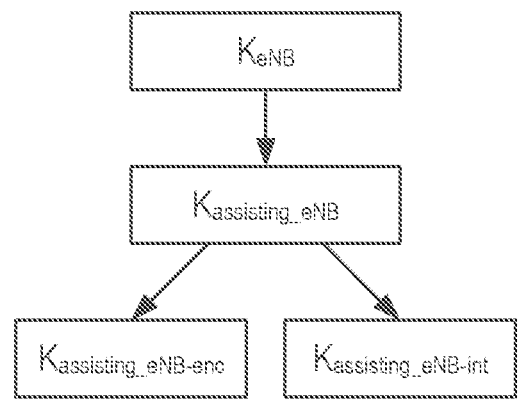
FIG. 4 illustrates a key derivation hierarchy based on an anchor base station key.

FIG. 4 shows how $K_{assisting\_eNB}$ can be generated based on the $K_{eNB}$ of the anchor eNB. The figure shows a possible key hierarchy for the assisting eNB. In this example, the assisting eNB and the wireless terminal shares the $K_{assisting\_eNB}$, $K_{assisting\_eNB-enc}$ and $K_{assisting\_eNB-int}$ keys, all of which are derived directly or indirectly from the $K_{eNB}$ for the anchor eNB.

The arrows in FIG. 4 indicate applications of Key Derivation Functions (KDF). A KDF can, for all practical purposes, be considered a one-way function. As is well known to those familiar with cryptographic techniques, one-way functions are easy to compute in the forward direction (the direction of the arrow), but computationally infeasible to invert. The implication of this is that access to a key lower in the key hierarchy does not give any useful information about a key higher up in the hierarchy. An example of a KDF is the HMAC-SHA256 function, which is the KDF used in LTE and in many other 3GPP systems.

A concrete example is in FIG. 4. If the $K_{assisting\_eNB}$ key is generated in the anchor eNB and sent to the assisting eNB, then the assisting eNB has access to $K_{assisting\_eNB}$ and the encryption and integrity keys that it derives. It will not, however, have access to the $K_{eNB}$.

Because it is assumed that the KDFs are known, the anchor eNB node, on the other hand, will have access to all keys used by the assisting eNB. This breaks the compartmentalization principle if it is interpreted in its strictest sense. However, the security level in this scenario is similar to the one obtained at an X2-handover, which is a handover in LTE that is handled without involvement of the Mobility Management Entity (MME). At an X2-handover, the source eNB calculates a new key based on the currently used $K_{eNB}$ and provides the new key to the target eNB. Another example of a similar situation arises in the context of relay nodes. In the case of relay nodes, the Donor-eNB acts as an S1-proxy for the relay node. As a result, the Donor-eNB has access to all keys used by the relay node. Because the security situation is similar to several that already arise in LTE networks, using $K_{eNB}$ as the basis keying material for the $K_{assisting\_eNB}$ may be considered acceptable from a security point of view.

The key hierarchy shown in FIG. 4 may be advantageously employed in a dual-connectivity scenario in which the anchor eNB controls the PDCP entities in the assisting eNB, i.e., the anchor eNB may establish new PDCP entities, delete them and re-start previously deleted PDCP entities. The anchor eNB and the mobile terminal (e.g., LTE UE) will each derive the $K_{assisting\_eNB}$ from the KeNB like this: $K_{assisting\_eNB}$=KDF(KeNB, other_params).

To avoid the possibility of well-known attacks that exploit the repeated transmission of encrypted data that carries known underlying data, it should be ensured that the $K_{assisting\_eNB}$ is "fresh" each time that a PDCP entity reuses the same COUNT values. Thus, the derivation of $K_{assisting\_eNB}$ should preferably comprise appropriate freshness parameters. One way to achieve freshness is to use the sequence numbers PDCP COUNT that are associated with some predetermined RRC message, such as the latest RRC Security Mode Command or Handover Command, or one of the RRC Reconfiguration Request or Complete messages that were used to establish the PDCP entities in the assisting eNB. Sequence numbers associated with other RRC messages may be used instead, of course. Other options for incorporating freshness into the generation of $K_{assisting\_eNB}$ include sending a fresh "nonce" from the wireless terminal to the anchor eNB or assisting eNB, from the anchor eNB or assisting eNB to the wireless terminal (or both directions) in some predetermined RRC message(s) or other protocol messages. A nonce is a (pseudo-) randomly generated number that, with a sufficiently high probability, will be unique with respect to the $K_{eNB}$.

Whatever the freshness parameters are, they are then included in the $K_{assisting\_eNB}$ derivation or in the derivation of the keys derived from Kassisting eNB. It is also possible to re-use existing information elements in RRC messages or information that is transmitted from the anchor eNB or assisting eNB in system information blocks. Any information can be used as long as it provides a (statistically) unique input with a sufficiently high probability.

Another possible design is that the anchor eNB derives the $K_{assisting\_eNB}$ from the KeNB without any freshness parameter. According to this alternative approach, if the assisting eNB or anchor eNB detects that a PDCP COUNT in the assisting eNB is about to wrap around, the anchor eNB initiates a KeNB key refresh via an intra-cell handover. A result of the intra-cell handover is that the wireless terminal and anchor eNB not only re-fresh the $K_{eNB}$, but also the $K_{assisting\_eNB}$; the $K_{assisting\_eNB}$ could be re-calculated in the same way it was derived the first time. This approach may require that the assisting eNB have to inform the anchor eNB about PDCP COUNTs that are about to be re-used.

Transporting the $K_{assisting\_eNB}$ from the anchor eNB to the assisting eNB can be done over the control channel between the two. The control channel has to be confidentiality and integrity protected as already stated.

Parameters other than those explicitly mentioned also may be input to the KDF, in various embodiments of the techniques described above. The parameters may be put in any of various different orders. Further, any one or more of the parameters for the KDF may be transformed before being input to the KDF. For example, a set of parameters P1, P2, . . . , Pn, for some non-negative integer n, could be transformed by first being run through a transformation function $f$ and the result of that, i.e., $f$(P1, P2, . . . , Pn), being input to the KDF.

In one example of the key derivation, the parameter P1 is first transformed before being input to the KDF to calculate a key called "output_key": output_key=KDF(f(P1), P2), where f is some arbitrary function or chain of functions and P1 and P2 are input parameters. Parameter P2, for example, might be 0, 1 or more other parameters, e.g., used to bind the key to a certain context. Parameters may be input as separate parameters or may be concatenated together and then input in one single input to the KDF. Even when variants of the KDF such as these are used, the core of the idea remains the same.

Regardless of which key establishment approach is used, existing handover procedures are generally unaffected when handing over the mobile terminal with dual connectivity to another base station, regardless of the type of the target base station. The anchor eNB can tear down the DRBs in the assisting eNB and perform the handover to the target base station according to existing specifications.

When handing over a wireless terminal to a target eNB and a target assisting eNB, the derivation of the $K_{eNB}$ and the $K_{assisting\_eNB}$ keys can be performed individually.

Key Derivation Based on $K_{ASME}$

Figure 5:
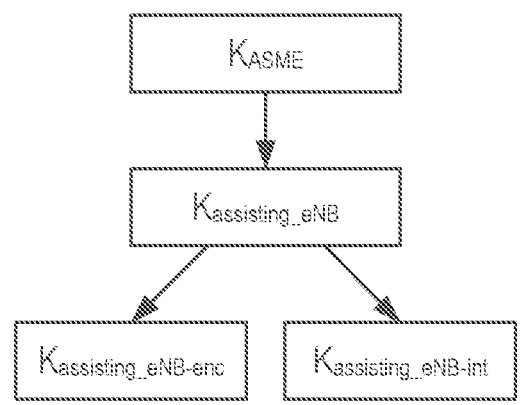
FIG. 5 illustrates a key derivation hierarchy based on an MME key.

Instead of using the anchor node's base key as the basis for generating $K_{assisting\_eNB}$, a key associated with another node in the wireless network and known to the mobile terminal may be used instead. For example, using the $K_{ASME}$ as keying material basis for the $K_{assisting\_eNB}$, as shown in FIG. 5, allows for a higher level of security, compared to the use of $K_{eNB}$ described above. As seen in FIG. 5, the $K_{assisting\_eNB}$ can be derived from the $K_{ASME}$, and the encryption and integrity keys for the assisting eNB derived from the resulting $K_{assisting\_eNB}$.

$K_{ASME}$ is the key established via subscriber authentication in LTE, and it is shared between the MME and the wireless terminal. If the $K_{assisting\_eNB}$ is derived from the $K_{ASME}$ and the MME provides the assisting eNB with this $K_{assisting\_eNB}$ directly, then the anchor node does not have access to the $K_{assisting\_eNB}$ or the encryption and integrity keys derived from it. In this case, then, the compartmentalization principle discussed above is adhered to in a stricter sense.

Basing the derivation of the $K_{assisting\_eNB}$ on $K_{ASME}$ requires that the MME is made aware of when the assisting eNB needs access to the keys, and further requires that there is a communication path between the two. Whether the MME is aware of when the wireless terminal is connected to the assisting eNB (and hence keys are needed) and whether there is a signalling path between the MME and assisting eNB depend on how the assisting eNB is controlled. If these conditions are not fulfilled, using the $K_{ASME}$ as keying material basis is less useful, although still possible, because the MME would have to send the $K_{assisting\_eNB}$ to the anchor node, which, in turn, provides it to the assisting eNB. In this scenario, of course, the anchor node has access to the $K_{assisting\_eNB}$.

Using $K_{ASME}$ as the keying material basis means that the $K_{assisting\_eNB}$ is derived from $K_{ASME}$ using a key derivation function $K_{assisting\_eNB}$=KDF($K_{ASME}$, [other_params]), where the optional other_params may include one or more freshness parameters.

As described earlier, when the PDCP packet counters (PDCP COUNT) are reset, the encryption and integrity keys should be renewed. If the same key is used with the same PDCP COUNTs, there will be key stream re-use, and potentially, replay attacks possible. Therefore, the MME and wireless terminal could include a freshness parameter in the key derivation. For example, the same freshness parameter as that is used when the $K_{eNB}$ is derived for the anchor node (the eNB). Which freshness parameter is used for the $K_{eNB}$ derivation may depend on the situation. Possible freshness parameters include nonces (random numbers used once) that the MME and wireless terminal exchange. Other possibilities are packet counters such as the NAS uplink or downlink COUNT, or a newly introduced counter that is transmitted either from the wireless terminal to the MME or from the MME to the wireless terminal. One drawback with a newly introduced counter is that if it gets out of synchronization, it has to be re-synchronized by some new re-synchronization mechanism.

Other parameters may be included in the $K_{assisting\_eNB}$ derivation as well. For example, the identity of the assisting eNB or the cell the assisting eNB use can be used as input. This is similar to how the $K_{eNB}$ is bound to cell identity. The purpose could be to further compartmentalize potential security breaches.

Once the MME has derived the $K_{assisting\_eNB}$, the MME also has to transfer it to the assisting eNB. Transferring the $K_{assisting\_eNB}$ to the assisting eNB can proceed in one of two ways, either directly to the assisting eNB, or indirectly, by first transferring the $K_{assisting\_eNB}$ to the eNB and then letting the eNB transfer it to the assisting eNB when necessary.

It is generally a security advantage to transfer the $K_{assisting\_eNB}$ directly from the MME to the assisting eNB. This way, only the MME, the assisting eNB and the wireless terminal know the key. If the signaling for establishing the connection between the assisting eNB and the wireless terminal is such that the MME is involved, then this is preferable.

The other alternative is for the MME to send the $K_{assisting\_eNB}$ to the eNB, which simply forwards the $K_{assisting\_eNB}$ to the assisting eNB. This approach has a security draw back in that the eNB is now also aware of the $K_{assisting\_eNB}$. The approach may be useful, however, if there is no direct signaling path between the MME and assisting eNB and the $K_{ASME}$ is the keying material used as basis for the $K_{assisting\_eNB}$ derivation.

Example Methods

In view of the detailed examples described above, it will be appreciated that FIGS. 6 and 7 are flow diagrams depicting example operations which may be taken by a network node and wireless terminal, respectively, where the network may be an anchor base station or an MME, in various embodiments. The illustrated process flow diagrams include some operations that are illustrated with a solid border and some operations that are illustrated with a dashed border. The operations which are comprised in a solid border are operations which are included in the broadest example embodiments. The operations which are comprised in a dashed border are example embodiments which may be comprised in, or a part of, or are further operations which may be taken in addition to the operations of the boarder example embodiments. Thus, those operations shown in dashed outlines may be considered "optional" in the sense that they may not appear in every instance of in every embodiment of the illustrated process. It should also be appreciated that the operations of FIGS. 6 and 7 are provided merely as an example.

Figure 6:
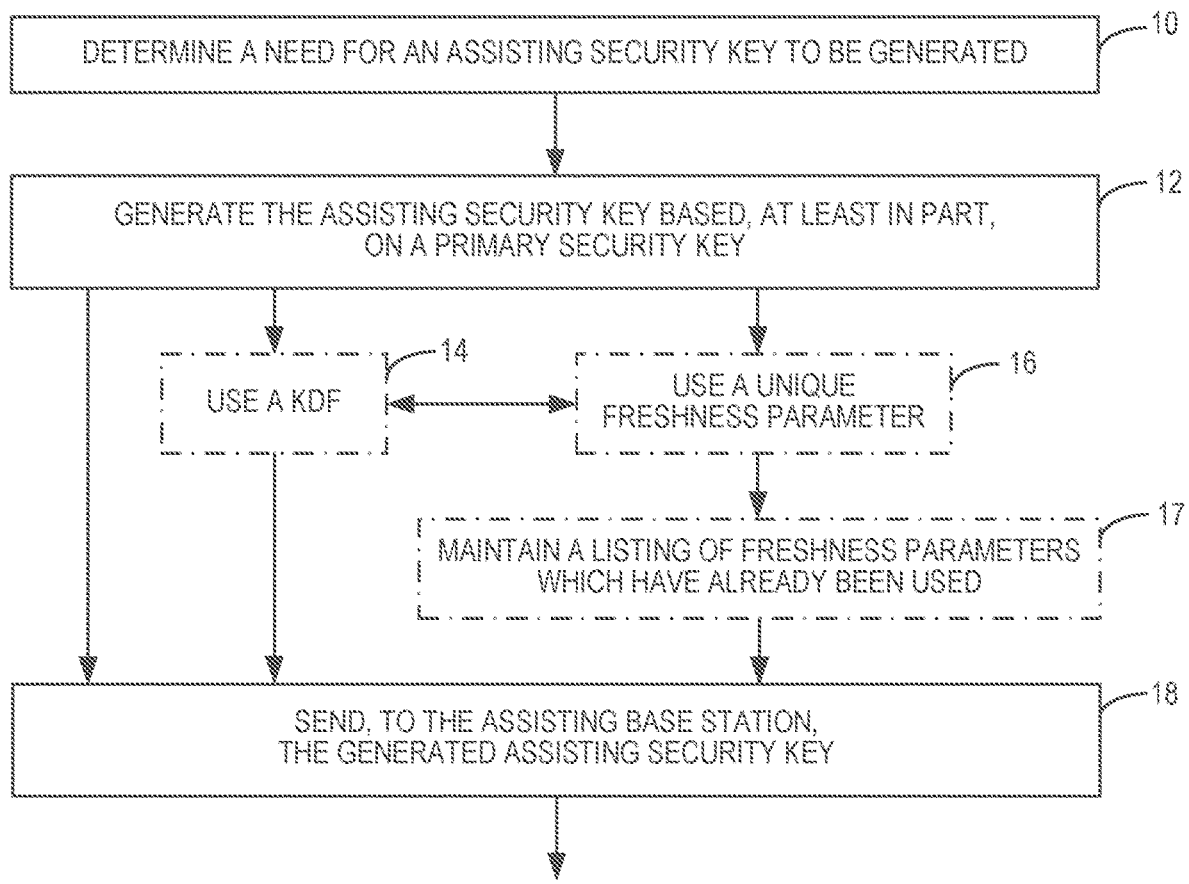
FIG. 6 is a process flow diagram illustrating an example method as implemented by an example network node.
Figure 7:
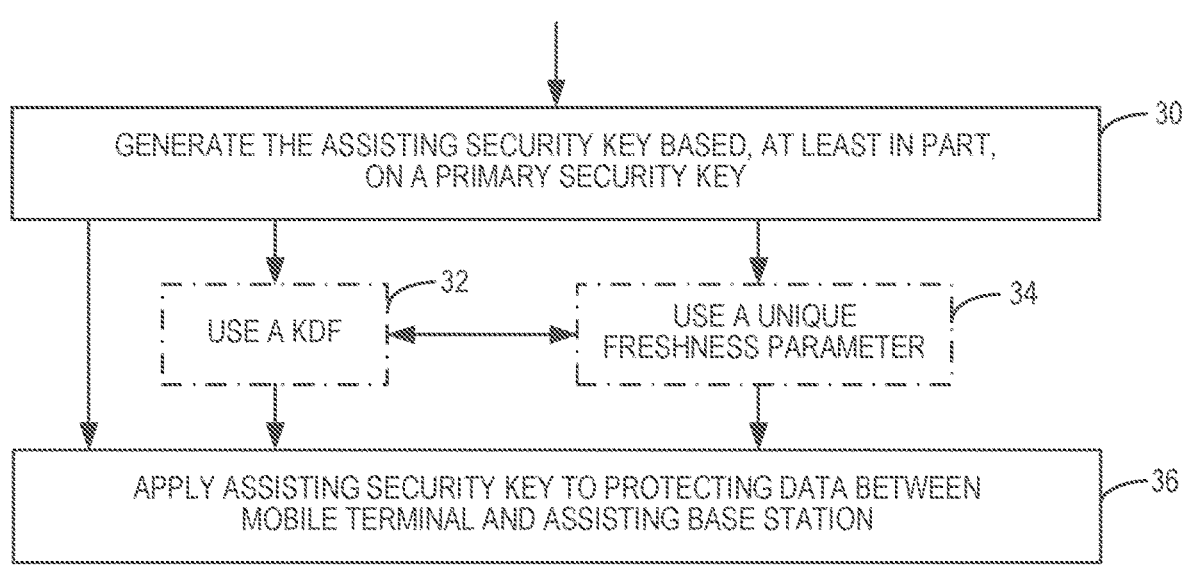
FIG. 7 is a process flow diagram illustrating an example method as implemented by a wireless terminal.

More particularly, FIG. 6 illustrates a process for generating an assisting security key for use by an assisting base station in a dual-connectivity scenario. The process shown in FIG. 6 may be implemented in a network node, such as in an anchor base station (e.g., an LTE anchor eNB) or in some other network node, such as an MME. As shown at block 10, the network node first determines a need for an assisting security key to be generated. This may be triggered by the establishment of a dual-connectivity scenario, for example. In response to this determining, the network node generates an assisting security key, based at least in part on a primary security key. This is shown at block 12. As explained in detail above, this primary security key may be, in various embodiments, an anchor node base key (e.g., $K_{eNB}$) or other key that is known to the network node and to the mobile terminal of interest, such as an MME key (e.g., $K_{ASME}$).

The generation of the assisting security key may incorporate the use of a KDF, e.g., a one-way cryptographic function, as well as one or more freshness parameters, as shown at blocks 12 and 16. A listing of freshness parameters that have already been used may be maintained in some embodiments, as shown at block 17.

As shown at block 18, the generated assisting security key is then sent to the assisting base station. In some cases, as detailed above, the assisting security key is then used to generate one or more additional keys for protecting data transferred to and from the mobile terminal, although the assisting security key might be used directly for such purposes in some embodiments.

FIG. 7 illustrates a corresponding method such as might be carried out in a mobile terminal. As shown at block 30, the mobile terminal generates the assisting security key, based at least in part on the same primary security key used by the network node in FIG. 6. Once again, this primary security key may be, in various embodiments, an anchor node base key (e.g., $K_{eNB}$) or other key that is known to the network node and to the mobile terminal of interest, such as an MME key (e.g., $K_{ASME}$). The generation of the assisting security key may incorporate the use of a KDF, e.g., a one-way cryptographic function, as well as one or more freshness parameters, as shown at blocks 32 and 34. A listing of freshness parameters that have already been used may be maintained in some embodiments, as shown at block 17.

As shown at block 36, the generated assisting security key is then applied to the protection of data sent to and from the assisting base station. In some cases, as detailed above, the assisting security key is used to generate one or more additional keys for protecting data transferred to and from the mobile terminal, although the assisting security key might be used directly for such purposes in some embodiments.

Figure 8:
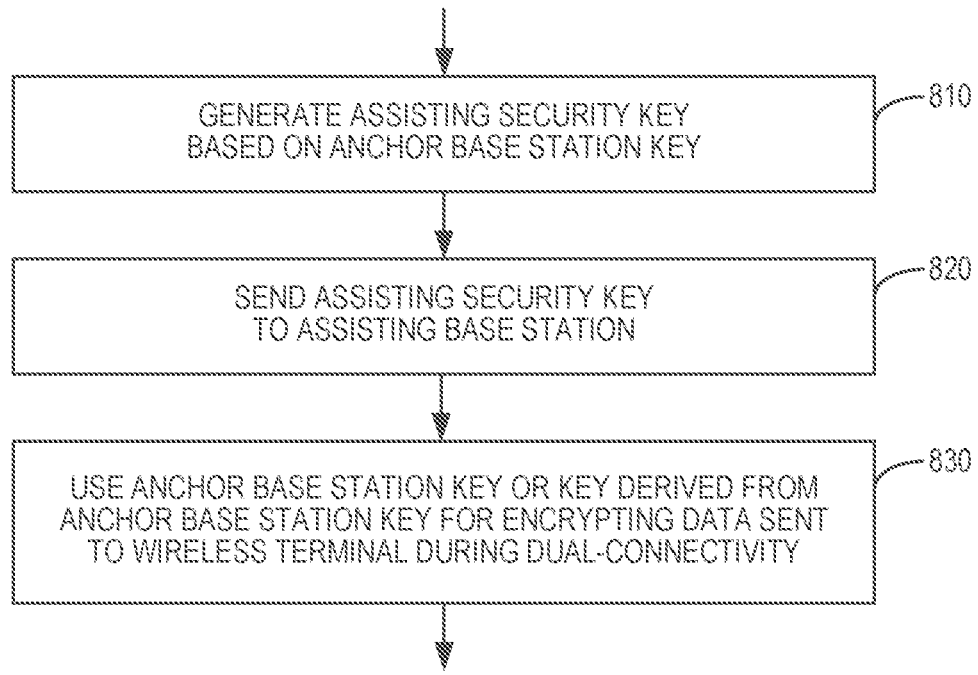
FIG. 8 and FIG. 9 each illustrate a process flow diagram corresponding to example embodiments of the presently disclosed techniques.
Figure 9:
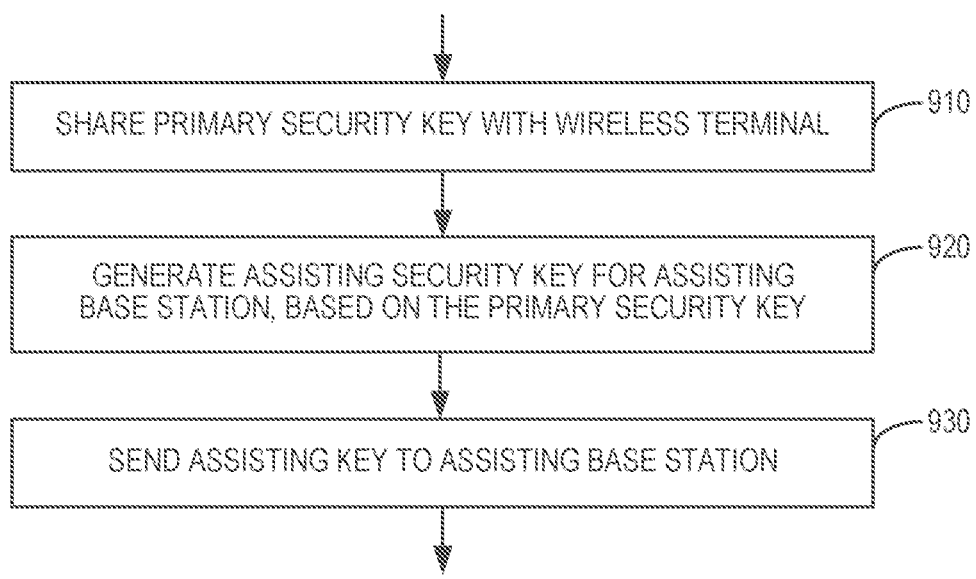

As discussed above, the assisting security key may be generated from an anchor node key or from a security key corresponding to another node, such as an MME, in various embodiments. FIGS. 8 and 9 are process flow diagrams corresponding respectively to these two scenarios. These methods may be carried out in an LTE network, for example, but can also be applied to other wireless networks that employ dual-connectivity.

FIG. 8 thus illustrates a method, suitable for implementation in a network node, for security key generation for secured communications between a wireless terminal and an anchor base station and between the wireless terminal and an assisting base station, wherein the wireless terminal is or is about to be dually connected to the anchor base station and the assisting base station. As shown at block 810, the illustrated method includes generating an assisting security key for the assisting base station, based, at least in part, on an anchor base station key. As shown at block 820, the generated assisting security key is then sent to the assisting base station, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station. As shown at block 830, the anchor base station key, or a key derived from the anchor base station key, is used for encrypting data sent to the wireless terminal by the anchor base station while the wireless terminal is dually connected to the anchor base station and the assisting base station.

In some embodiments of the method illustrated in FIG. 8, the generated assisting security key comprises a base assisting security key for use in generating one or more additional assisting security keys for encrypting data traffic sent to the wireless terminal by the assisting base station. In some of these embodiments, the anchor base station and the mobile terminal may each derive an encryption key, or an integrity key, or both, from the anchor base station key, and use the derived key or keys for protecting data sent to or received from the wireless terminal by the anchor base station while the wireless terminal is dually connected to the anchor base station and the assisting base station.

In some of the embodiments shown in FIG. 8, generating the assisting security key comprises deriving the assisting security key from the anchor base station key using a one-way function. The one-way function may be an HMAC-SHA-256 cryptographic function, in some embodiments. In some of these and in some other embodiments, the generating of the assisting security key is further based on a freshness parameter.

In some embodiments, the illustrated method may further include detecting that a Packet Data Convergence Protocol (PDCP) COUNT parameter in the assisting base station is about to wrap around and, in response, initiating a refresh of the anchor base station key and re-calculating the assisting security key.

In some embodiments, a single assisting security key is used to generate a set of keys for use in all Data Radio Bearers. In other embodiments, multiple assisting security keys may be used, in which case the generating operation described above is repeated for each of a plurality of Data Radio Bearers established between the wireless terminal and the assisting base station, such that the resulting assisting security keys differ for each Data Radio Bearer. Multiple ones of the resulting several keys may be sent at the same time, in some embodiments.

FIG. 9 is a process flow diagram illustrating another method for generating an assisting security key for an assisting base station. Like the method shown in FIG. 8, the process of FIG. 9 is suitable for implementation in a network node, for security key generation for secured communications between a wireless terminal and an anchor base station and between the wireless terminal and an assisting base station, where the wireless terminal is or is about to be dually connected to the anchor base station and the assisting base station. In this method, however, the method may be carried out in a network node other than the anchor base station, using a primary key that may be unknown to the anchor base station.

As shown at block 910, the illustrated method includes sharing a primary security key with the wireless terminal. This key may be unknown to the anchor base station, in some embodiments. An example is the $K_{ASME}$ key discussed above, which is shared between the LTE MME and the mobile terminal.

As shown at block 920, the method continues with generating an assisting security key for the assisting base station, based, at least in part, on the primary security key. The generated assisting security key is then sent to the assisting base station, as shown at block 930, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station. In some embodiments, the generated assisting security key is sent directly to the assisting base station such that the anchor base station is not aware of the key, while in other embodiments the generated assisting security key is sent to the assisting base station indirectly, via the anchor base station.

In some embodiments, the generated assisting security key comprises a base assisting security key for use in generating one or more additional assisting security keys for encrypting data traffic sent to the wireless terminal by the assisting base station. In some of these and in some other embodiments, generating the assisting security key comprises deriving the assisting security key from the anchor base station key using a one-way function. The one-way function may be an HMAC-SHA-256 cryptographic function, for example. As discussed in detail above, generating the assisting security key may be further based on a freshness parameter, in some embodiments.

Example Hardware Implementations

Several of the techniques and methods described above may be implemented using electronic data processing circuitry and radio circuitry or other interface circuitry provided in a network node, such as an anchor base station or in an MME, while others may be implemented using radio circuitry and electronic data processing circuitry provided in a wireless terminal.

Figure 10:
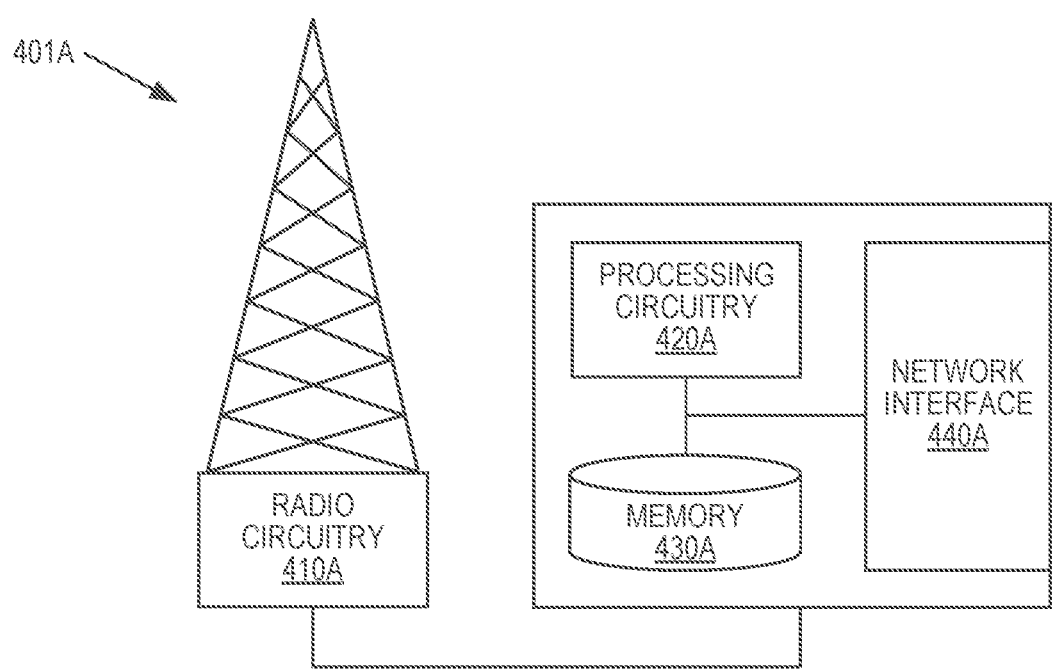
FIG. 10 is a block diagram illustrating an example anchor base station apparatus, according to the presently disclosed techniques.

FIG. 10 illustrates an example node configuration of an anchor base station 401A which may perform some of the example embodiments described herein. The anchor base station 401A may comprise radio circuitry or a communication port 410A that may be configured to receive and/or transmit communication measurements, data, instructions, and/or messages. The anchor base station 401A may further comprise a network interface circuit 440A which may be configured to receive or send network communications, e.g., to and from other network nodes. It should be appreciated that the radio circuitry or communication port 410A may be comprised as any number of transceiving, receiving, and/or transmitting units or circuitry. It should further be appreciated that the radio circuitry or communication 410A may be in the form of any input or output communications port known in the art. The radio circuitry or communication 410A and/or network interface 440A may comprise RF circuitry and baseband processing circuitry, the details of which are well known to those familiar with base station design.

The anchor base station 401A may also comprise a processing unit or circuitry 420A which may be configured to perform operations related to the generation of assisting security keys (e.g., security keys for an assisting eNB), as described herein. The processing circuitry 420A may be any suitable type of computation unit, e.g. a microprocessor, digital signal processor (DSP), field programmable gate array (FPGA), or application specific integrated circuit (ASIC), or any other form of circuitry. The anchor base station 401A may further comprise a memory unit or circuitry 430A which may be any suitable type of computer readable memory and may be of volatile and/or non-volatile type. The memory 430A may be configured to store received, transmitted, and/or any information related to the generation of security keys or freshness parameters, device parameters, communication priorities, and/or executable program instructions.

Typical functions of the processing circuit 420A, e.g., when configured with appropriate program code stored in memory 430A, include modulation and coding of transmitted signals and the demodulation and decoding of received signals. In several embodiments of the present invention, processing circuit 420A is adapted, using suitable program code stored in program storage memory 430A, for example, to carry out one of the techniques described above for handling security keys in a dual-connectivity scenario. Of course, it will be appreciated that not all of the steps of these techniques are necessarily performed in a single microprocessor or even in a single module.

It will be appreciated that the processing circuit 420A, as adapted with program code stored in program and data memory 430A, can implement the process flow of FIG. 8 (or a variant thereof) using an arrangement of functional "modules," where the modules are computer programs or portions of computer programs executing on the processor circuit 420A. Thus, the apparatus 401A can be understood as comprising a communications interface 440A configured to communicate with the assisting base station, and further comprising several functional modules implemented in processing circuitry 420A. These functional modules include: a generating module for generating an assisting security key for the assisting base station, based, at least in part, on an anchor base station key; a sending module for sending to the assisting base station, using the interface circuitry, the generated assisting security key, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station; and an encryption module for using the anchor base station key, or a key derived from the anchor base station key, for encrypting data sent to the wireless terminal by the anchor base station while the wireless terminal is dually connected to the anchor base station and the assisting base station.

Figure 11:
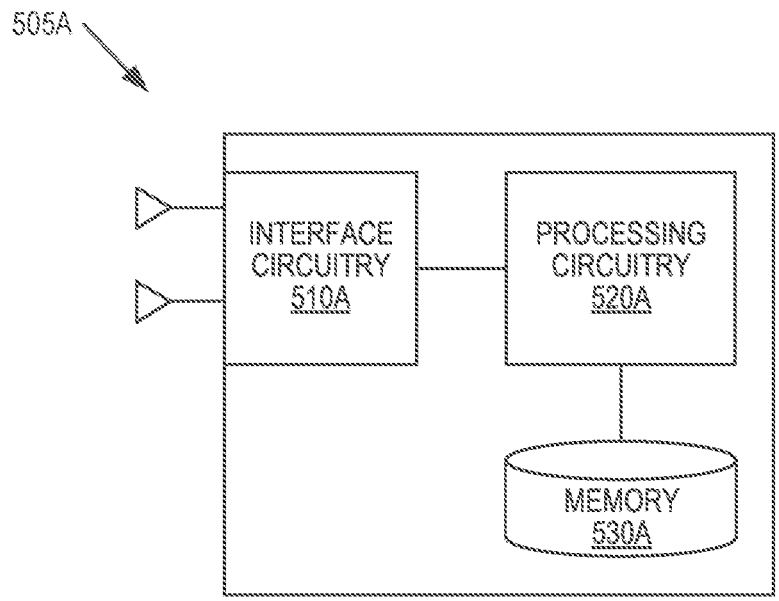
FIG. 11 is a block diagram illustrating another example network node apparatus, according to the presently disclosed techniques.

FIG. 11 illustrates an example node configuration of a mobility management node 505A (e.g., a MME, SGSN, S4-SGSN) which may perform some of the example embodiments described herein. The mobility management node 505A may comprise interface circuitry or a communication port 510A that may be configured to receive and/or transmit communication measurements, data, instructions, and/or messages. It should be appreciated that the radio circuitry or communication port 510A may be comprised as any number of transceiving, receiving, and/or transmitting units or circuitry. It should further be appreciated that the radio circuitry or communication 510A may be in the form of any input or output communications port known in the art. The interface circuitry or communication 510A may comprise RF circuitry and baseband processing circuitry (not shown).

The mobility management node 505A may also comprise a processing unit or circuitry 520A which may be configured to perform operations related to the generation of assisting security keys (e.g., security keys for an assisting eNB), as described herein. The processing circuitry 520A may be any suitable type of computation unit, e.g. a microprocessor, digital signal processor (DSP), field programmable gale array (FPGA), or application specific integrated circuit (ASIC), or any other form of circuitry. The mobility management node 505A may further comprise a memory unit or circuitry 530A which may be any suitable type of computer readable memory and may be of volatile and/or non-volatile type. The memory 530A may be configured to store received, transmitted, and/or any information related to the generation of security keys or freshness parameters, device parameters, communication priorities, and/or executable program instructions for use by processing circuitry 520A.

In several embodiments of the present invention, processing circuit 520A is adapted, using suitable program code stored in program storage memory 530A, for example, to carry out one of the techniques described above for handling security keys in a dual-connectivity scenario. Of course, it will be appreciated that not all of the steps of these techniques are necessarily performed in a single microprocessor or even in a single module.

Figure 12:
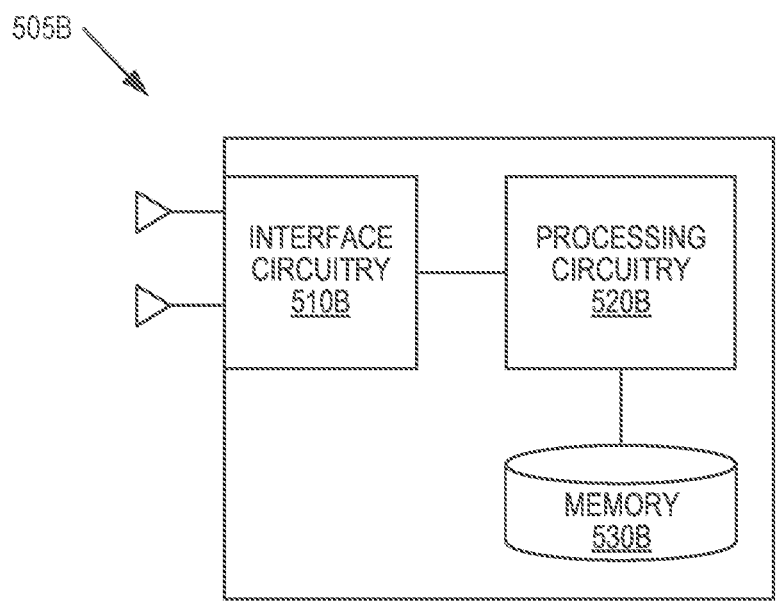
FIG. 12 illustrates components of an example wireless terminal configured according to some of the presently disclosed embodiments.

It will be appreciated that the processing circuit 520A, as adapted with program code stored in program and data memory 530A, can implement the process flow of FIG. 9 (or a variant thereof) using an arrangement of functional "modules," where the modules are computer programs or portions of computer programs executing on the processor circuit 520A. Thus, the apparatus 501A can be understood as comprising a communications interface 540A configured to communicate with the assisting base station, and further comprising several functional modules implemented in processing circuitry 520A. These functional modules include: a sharing module for sharing a primary security key with the wireless terminal; a generating module for generating an assisting security key for the assisting base station, based, at least in part, on the primary security key; and a sending module for sending to the assisting base station, via the interface circuitry, the generated assisting security key, for use by the assisting base station in encrypting data traffic sent to the wireless terminal or in generating one or more additional assisting security keys for encrypting data traffic sent to the wireless terminal by the assisting base station while the wireless terminal is dually connected to the anchor base station and the assisting base station. FIG. 12 illustrates an example node configuration of a wireless terminal 505B which may be configured to carry out some of the example methods described herein. The wireless terminal 505B may comprise interface circuitry or a communication port 510B that may be configured to receive and/or transmit communication measurements, data, instructions, and/or messages. It should be appreciated that the radio circuitry or communication port 510B may be comprised as any number of transceiving, receiving, and/or transmitting units or circuitry. It should further be appreciated that the radio circuitry or communication 510B may be in the form of any input or output communications port known in the art. The interface circuitry or communication 510B may comprise RF circuitry and baseband processing circuitry (not shown).

The wireless terminal 505B may also comprise a processing unit or circuitry 520B which may be configured to perform operations related to the generation of assisting security keys (e.g., security keys for an assisting eNB), as described herein. The processing circuitry 520B may be any suitable type of computation unit, e.g. a microprocessor, digital signal processor (DSP), field programmable gate array (FPGA), or application specific integrated circuit (ASIC), or any other form of circuitry. The wireless terminal 505B may further comprise a memory unit or circuitry 530B which may be any suitable type of computer readable memory and may be of volatile and/or non-volatile type. The memory 530B may be configured to store received, transmitted, and/or any information related to the generation of security keys or freshness parameters, device parameters, communication priorities, and/or executable program instructions.

Accordingly, in various embodiments of the invention, processing circuits, such as the processing circuits 520A and 520B and their corresponding memory circuits 530A and 530B, are configured to carry out one or more of the techniques described in detail above. Other embodiments may include base stations and/or other network nodes that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless terminal, for security key generation for secured communications between the wireless terminal and an assisting base station, wherein the wireless terminal is dually connected to an anchor base station and the assisting base station, wherein a primary security key is known to the anchor base station and the wireless terminal, the method comprising:
    generating an assisting security key, based on the primary security key and a freshness parameter, wherein the freshness parameter has been received in a Radio Resource Control message from the anchor base station; and
    using the assisting security key in generating one or more additional assisting security keys for encrypting data traffic, wherein the data traffic is sent from the wireless terminal to the assisting base station while the wireless terminal is dually connected to the anchor base station and the assisting base station.

2. The method of claim 1, wherein the generated assisting security key comprises a base assisting security key for use in generating one or more additional assisting security keys for encrypting data traffic sent to the wireless terminal by the assisting base station.

3. The method of claim 1, wherein generating the assisting security key comprises deriving the assisting security key from the primary security key using a one-way function.

4. The method of claim 3, wherein the one-way function is an HMAC-SHA-256 cryptographic function.

5. A wireless terminal, for security key generation for secured communications between the wireless terminal and an assisting base station, the wireless terminal comprising interface circuitry and processing circuitry, wherein the wireless terminal is configured to be dually connected to an anchor base station and the assisting base station, and wherein the processing circuitry is configured to:

generate an assisting security key, based on a primary security key which is known to the anchor base station and the wireless terminal and a freshness parameter received from the anchor base station in a Radio Resource Control message; and use the assisting security key in generating one or more additional assisting security keys for encrypting data traffic, wherein the data traffic is sent from the wireless terminal to the assisting base station while the wireless terminal is dually connected to the anchor base station and the assisting base station.

6. The wireless terminal of claim 5, wherein the processing circuitry is further configured to generate the assisting security key by deriving the assisting security key from the primary security key using a one-way function.

7. The wireless terminal of claim 6, wherein the one-way function is an HMAC-SHA-256 cryptographic function.

8. The wireless terminal of claim 5, further configured to store the freshness parameter in a memory of the wireless terminal.

9. The wireless terminal of claim 5, further configured to store the primary security key and/or the assisting security key in a memory of the wireless terminal.

* * * * *

UNITED STATES PATENT AND TRADEMARK OFFICE
CERTIFICATE OF CORRECTION

PATENT NO. : 10,708,772 B2
APPLICATION NO. : 16/111979
DATED : July 7, 2020
INVENTOR(S) : Wager et al.

Page 1 of 1

It is certified that error appears in the above-identified patent and that said Letters Patent is hereby corrected as shown below:

In the Specification

Column 1, Line 19, delete "rebates" and insert -- relates --, therefor.

Column 1, Line 66, delete "NodeB's, enhanced NodeB's," and insert -- NodeBs, enhanced NodeBs, --, therefor.

Column 6, Line 2, delete "Node B's" and insert -- NodeBs --, therefor.

Column 7, Line 24, delete "Node B's," and insert -- NodeBs, --, therefor.

Column 7, Lines 25-26, delete "MSR B's, eNodeB's," and insert -- MSR Bs, eNodeBs, --, therefor.

Column 7, Line 51, delete "3GFP," and insert -- 3 GPP, --, therefor.

Column 7, Lines 55-56, delete "Un-protocol" and insert -- Uu-protocol --, therefor.

Column 7, Line 67, delete "eNB" and insert -- eNB. --, therefor.

Column 8, Line 11, delete "entitles" and insert -- entities --, therefor.

Column 8, Line 12, delete "key. KKRC-enc," and insert -- key, KKRC-enc, --, therefor.

Column 10, Line 36, delete "Kassisting eNB." and insert -- $K_{assisting\_eNB}$. --, therefor.

Column 16, Line 62, delete "gale" and insert -- gate --, therefor.

Signed and Sealed this
Fifth Day of January, 2021

Andrei Iancu
*Director of the United States Patent and Trademark Office*